Nov. 14, 1939.   J. L. LAYFIELD   2,179,641
ARTIFICIAL FISH LURE
Filed April 15, 1939
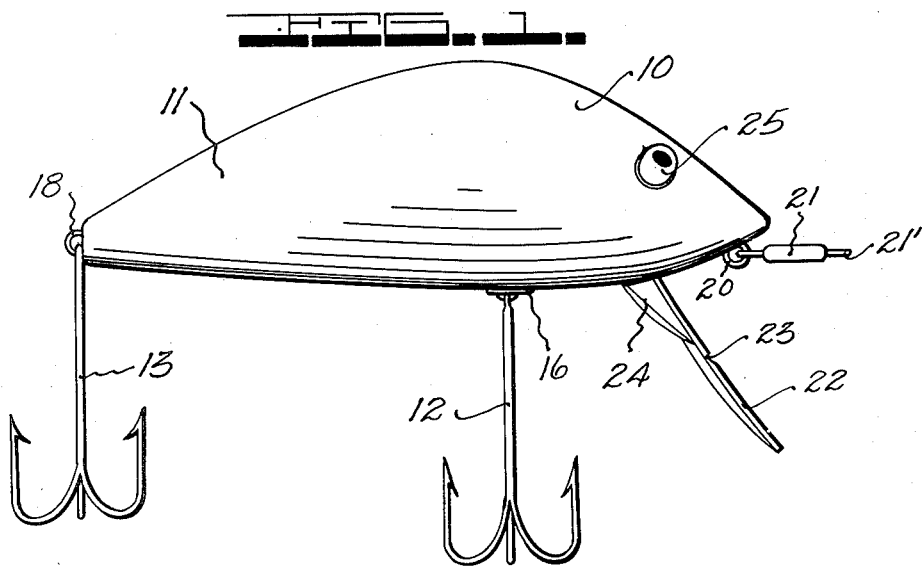
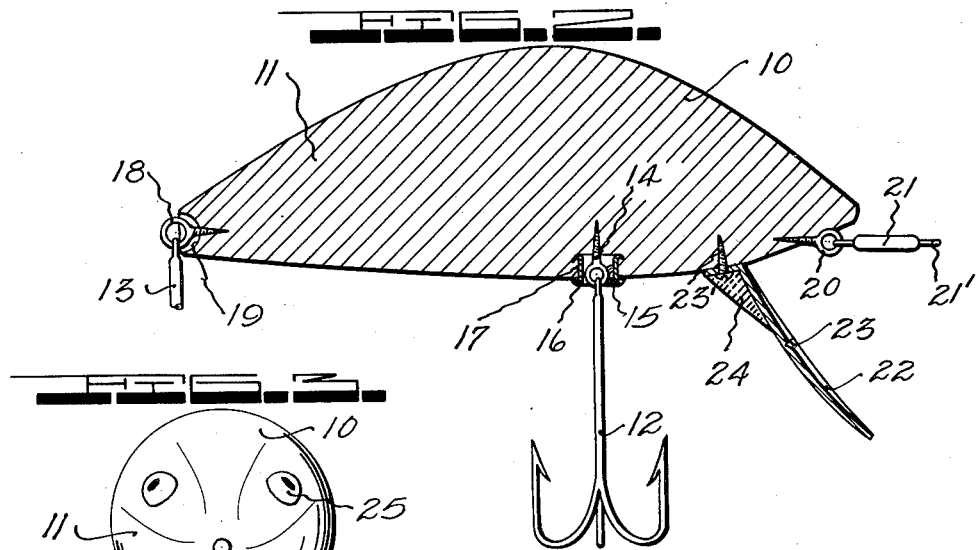
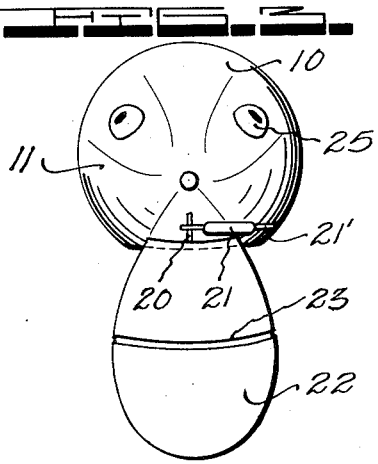
JESTER L. LAYFIELD
INVENTOR.
BY
ATTORNEY.

Patented Nov. 14, 1939

2,179,641

UNITED STATES PATENT OFFICE 2,179,641

ARTIFICIAL FISH LURE

Jester L. Layfield, Powell, Tex.

Application April 15, 1939, Serial No. 268,037

3 Claims. (Cl. 43—46)

This invention relates to new and useful improvements in artificial fish lures particularly adapted for use in the fish casting art.

An important object of the invention is to provide a forwardly weighted lure having means secured thereto whereby the lure is given a lifelike wriggling motion as the same is propelled through water.

Another object of the invention is to provide a downwardly depending grooved spoon shaped member which prohibits the lure from breaking the surface of the water when said lure is rapidly propelled through water.

Another object of the invention is to provide an artificial fish lure so constructed as to find a deeper level when propelled slowly through water and to rise when trawled swiftly.

Another object of the invention is to provide an artificial lure which will function properly in swift water as well as in quiet water due to the peculiar shape of the body. Moreover, the hooks in the body are so connected that they will lie close against the body without touching the latter.

Still another object of the invention is to provide an improved means for attaching the hooks to the body of the present improved artificial lure.

A still further object of the invention is to provide an improved means for securing the artificial lure to a casting line.

A construction designed to carry out the invention will hereinafter be described together with other features of the invention.

The invention will be more readily understood from a reading of the following specification and by reference to the accompanying drawing illustrating one form of carrying out the invention and wherein:

Figure 1 is a side elevation of an artificial fish lure constructed in accordance with the present invention.

Figure 2 is a longitudinal vertical sectional view of the same, and

Figure 3 is a front elevation of the lure.

In the drawing, the numeral 10 designates an artificial fish lure constructed in accordance with the present invention. A body 11 is provided with a central bottom hook 12 and a tail hook 13. By observing Figure 2 it may be seen that after the eye 14 of the hook 12 has been threaded into the body 11 said eye is soldered at 15 to the grommet 16 provided within a hole 17 of the body. This arrangement will prohibit the loss of the hook 12 due to the unthreading of the eye 14 from the body.

An eye 18 is used to secure the tail hook 13 to the body 11 whereby the rear portion of said body may be drilled or reamed out as at 19 to afford a nose-heavy body.

An eye 20 is threaded into the forward under side of the body, said eye having a member 21 secured therein. The free end 21' of this member has an eye therein whereby the user of the device may employ any suitable knot to secure the device to a line and in no way interfere with the movement of the device in water.

Approximately midway between the points of fastening of the eyes 14 and 20, an oval spoon-shaped disc 22 is disposed. The upper portion of the disc is secured to the body by screws 23', for increasing the rigidity of the structure. A horizontal groove 23 is provided in the forward face of the disc for water breaking purposes. This groove serves to break the water in such a manner as to give the lure a life-like "wriggling" motion as the same passes through water. Said groove also affords means to facilitate passage of said lure through said water.

The disc 22 is spoon or dish shaped in such a manner that said disc will tend to force the lure to a lower depth in water when said lure is trawled slowly through said water. Also if the trawling be rapid said disc will allow the lure to rise close to the surface of said water but will not allow said lure either to break the surface of or leave said water during the rapid trawling action. This action is facilitated by a lead weight 24 secured to the underside of the disc adjacent the body 11.

False eyes 25 are provided on the upper forward side of the body, while the body may be brightly and attractively painted to further add to the general appearance of the lure. It is to be noted that the disc 22 is of highly polished nickel or other suitable reflecting material whereby a flashing is had as the lure travels through the water.

Manifestly, the construction as shown and described is capable of some modification and such modification as may be construed within the scope and meaning of the appended claims is also considered to be within the spirit and intent of the invention.

What is claimed is:

1. An artificial fish lure comprising in combination, a body, fish hooks secured to said body, an oval spoon shaped disc projecting forwardly and downwardly from said body, means on the forward face of said body to transmit a life-like motion to said body, a keel weight secured to said disc adjacent said body, said disc and said weight cooperating to control the depth maintained by said body during forward travel thereof, and guide means for maintaining said lure in a desirable position during use thereof.

2. An artificial fish lure comprising a body, hooks secured to said body, solder between the retaining eyes of said hooks and said body to prevent separation thereof, an oval spoon-shaped disc projecting forwardly and downwardly from said body, a keel weight secured to said disc adjacent said body and cooperating with said body to maintain desirable depths of said lure during forward motion thereof, means on the forward face of said spoon to impart a side-wise motion to said lure during the forward travel thereof, a line, and a link pivotally secured to the bottom forward side of said body, said line secured to the free end of link whereby said line will in no way interfere with the position of said lure.

3. An artificial fish lure comprising a body, fish hooks, means for fixedly securing said hooks to said body to prevent loss of said hooks, an oval spoon-shaped disc projecting from said body, a weight secured to said disc adjacent said body, said disc and said weight cooperating to maintain a desirable depth level during forward travel thereof, a horizontal groove in the forward face of said disc for producing a sidewise motion of said lure during forward motion thereof, and pivoted tying means secured to said body to assure a desired position of said lure during use.

JESTER L. LAYFIELD.